(12) United States Patent
Rabrenovic

(10) Patent No.: US 10,530,103 B2
(45) Date of Patent: Jan. 7, 2020

(54) STRUCTURE OF ELECTRICAL CONNECTOR CASING

(71) Applicant: Alpine Electronics, Inc., Tokyo (JP)

(72) Inventor: Milan Rabrenovic, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 239 days.

(21) Appl. No.: 15/468,504

(22) Filed: Mar. 24, 2017

(65) Prior Publication Data

US 2018/0277977 A1    Sep. 27, 2018

(51) Int. Cl.
*H01R 13/74*    (2006.01)

(52) U.S. Cl.
CPC ....... *H01R 13/743* (2013.01); *H01R 2201/26* (2013.01)

(58) Field of Classification Search
CPC ........ H01R 11/20; H01R 13/62; H01R 33/00; H01R 33/465; H01R 13/743; H01R 2201/26
See application file for complete search history.

(56) References Cited

U.S. PATENT DOCUMENTS

| | | | |
|---|---|---|---|
| D360,871 S | 8/1995 | Wilson | |
| 6,305,957 B1 * | 10/2001 | Fink | H01R 13/62977 439/157 |
| 6,682,363 B1 * | 1/2004 | Chang | H01R 24/64 439/409 |
| 7,435,113 B2 * | 10/2008 | Cheng | H01R 13/6295 439/157 |
| 7,815,462 B2 * | 10/2010 | Boeck | H01R 4/2433 439/409 |
| 8,070,506 B2 * | 12/2011 | De Dios Martin | H01R 4/2433 439/409 |
| D736,162 S | 8/2015 | Barabas et al. | |
| 9,209,553 B2 | 12/2015 | Rimke | |
| 9,368,924 B2 | 6/2016 | Byrne et al. | |
| 9,474,178 B2 * | 10/2016 | Binner | H01R 9/2408 |
| 2006/0040535 A1 * | 2/2006 | Koshy | H01R 13/62977 439/157 |
| 2008/0050965 A1 * | 2/2008 | Szelag | H01R 4/2433 439/387 |
| 2016/0072235 A1 * | 3/2016 | Strelow | H01R 24/30 439/660 |

FOREIGN PATENT DOCUMENTS

JP    2014-155396    8/2014

* cited by examiner

*Primary Examiner* — Carl J Arbes

(74) *Attorney, Agent, or Firm* — Muramatsu & Associates

(57) ABSTRACT

An electrical connector casing enclosing an electrical connector comprises a case part having a connector inlet, and a lid part having a lid opening, where the openings of the connector inlet and the lid opening have a substantially the same shape and are angled differently from each other as viewed from a front-back direction. An electric connector is inserted from the back of the lid part through the lid opening, and is rotated to be inserted into the connector inlet from the back of the case part. When the lid part attaches to the case part, due to the rotationally different angles between the lid opening and the connector inlet, the electric connector is securely held inside the casing.

14 Claims, 16 Drawing Sheets

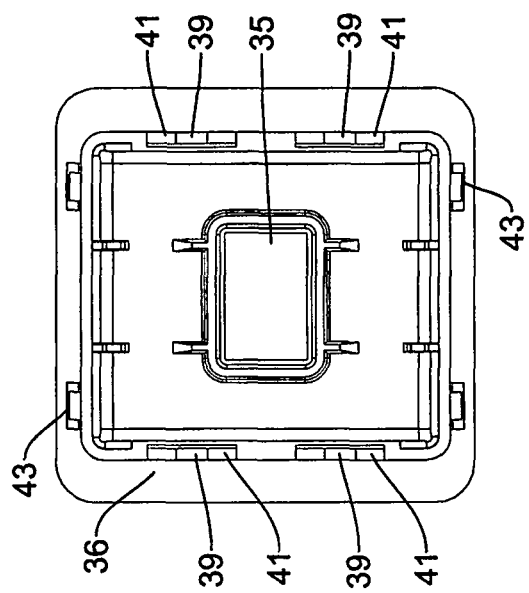
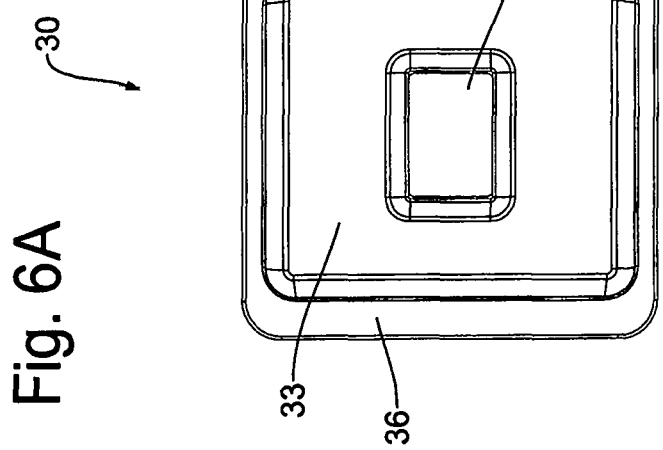
Fig. 6B
Fig. 6A

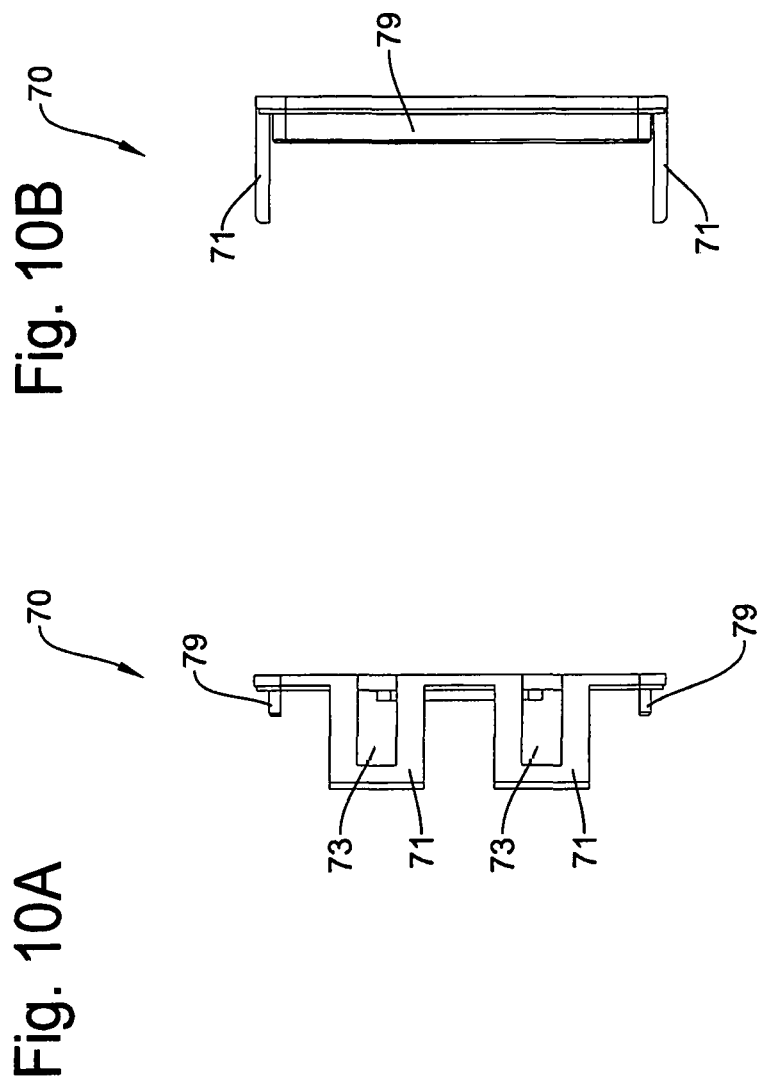

STRUCTURE OF ELECTRICAL CONNECTOR CASING

FIELD OF THE INVENTION

This invention relates to an electrical connector casing, and more particularly, to a structure of electrical connector casing that receives an electrical connector at one end of a cable and securely fixes therein and a method of using the electrical connector casing for easily mounting the electrical connector inside the electronic connector casing.

BACKGROUND OF THE INVENTION

In order to improve or add certain technological features to vehicles, vehicle owners may replace factory-installed head units with aftermarket products such as infotainment systems that offer enhanced features such as navigation, satellite radio, internet connectivity and other desirable functionality. Such aftermarket products may also allow users to connect various electric devices, such as laptop computers, mobile audio devices, smartphones, USB memory devices, tablet devices, etc., typically via a USB ("Universal Serial Bus") connector or through other electrical connectors. However, because vehicles do not provide ready-made outlets for such connectors, users are forced to place such connectors in inconvenient locations such as through a glovebox, or must devise ad hoc outlets by cutting, drilling or otherwise modifying the vehicle dash, console or interior at additional expense and effort.

Accordingly, it is desirable to provide a casing to secure electrical connectors in existing pre-formed openings in the vehicle dash, console or interior. An electrical connector casing is used to enclose an electrical connector at an end of an electrical cable for securely mounting the connector as well as for aesthetic and protective purposes. Although the present invention is not limited to a particular type of connector mounted in a specific location, in this disclosure, a USB connector mounted in a vehicle is mainly described as an example.

When a USB connector is mounted in a casing, it is necessary that the USB connector is securely and fixedly held inside the casing. If the USB connector fails to be securely held inside the casing, the USB connector can be accidentally displaced when another connector is plugged into the USB connector. While the USB connector needs to be securely held inside the casing, the mechanism for mounting the connector in the casing should be simple so that general users can assemble the casing easily without using special tools.

Thus, there is a need for an electrical connector casing that can receive an electrical connector of electrical cable and securely and easily fix the connector inside the casing while having a simple structure without requiring special tools to firmly hold the connector inside the casing.

SUMMARY OF THE INVENTION

It is, therefore, an object of the present invention to provide a structure and method of electrical connector casing that receives an electrical connector at one end of a cable and securely mounts the electrical connector to the inside of the electronic connector casing.

It is another object of the present invention to provide a structure and method of electrical connector casing that can stably hold the electric connector and can be assembled easily and quickly by anyone without using any tools.

It is a further object of the present invention to provide a structure and method of electrical connector casing that is able to firmly hold the electrical connector inside of the casing without causing any stress on the connector or cable.

It is a further object of the present invention to provide a structure and method of electrical connector casing that can be manufactured at low cost.

One aspect of the present invention is a structure of electrical connector casing for mounting an electrical connector inside thereof. The electrical connector casing includes: a case part having a connector inlet that penetrates from a front to a back, the connector inlet being adopted to receive and hold an electrical connector and expose an end port of the electrical connector to the front of the connector inlet, and a lid part having a lid opening with a shape that matches with a frontal shape of the electrical connector to allow the electrical connector to pass therethrough. The lid part is adopted to directly attach to the case part by snap fitting, and the connector inlet and the lid opening as viewed from a front-back direction are placed with different rotational angle from one another.

In the electrical connector casing of the present invention, the lid part further comprises a back stopper that inwardly projects from a back wall of the lid part around the lid opening, and a part of the back stopper contacts with an outer body of the electrical connector to stably support the electrical connector. Alternatively, the back stopper is inclined to fit with a back slope of the outer body of the electrical connector. The lid part has a plurality of sidewalls each having an aperture to fit with an interlocking protrusion formed on the case part thereby snap fitting the lid part and the case part when attached together.

In the electrical connector casing of the present invention, the shape of the lid opening is an elongated rectangle. The lid opening having the elongated rectangle shape is placed to be longer in a horizontal direction. Alternatively, the lid opening having the elongated rectangle shape is placed to be longer in a vertical direction. The difference of the rotational angle between the connector inlet and the lid opening is about 90 degrees. Alternatively, the difference of the rotational angle between connector inlet and the lid opening is greater than 45 degrees.

In the electrical connector casing of the present invention, the connector inlet is formed in a rectangular tube shape. The connector inlet is placed to be longer in the horizontal direction. Alternatively, the connector inlet is placed to be longer in the vertical direction when the lid opening is place to be longer in the horizontal direction. The electrical connector casing further includes a stopper at the front end of the connector inlet that stops the electrical connector inserted to the connector inlet.

In the electrical connector casing of the present invention, a center of the connector inlet and a center of the lid opening are aligned in a straight line from the front to the back so that a cable having the electrical connector at one end can come straight out of the lid opening without being bent or twist.

Further aspect of the present invention is a method of enclosing an electrical connector in a casing. The method includes the steps of: passing an electrical connector through a lid opening of a lid part from a back; rotating the electrical connector to an angle to fit into a connector inlet opening of a case part after the electrical connector has been fully passed through the lid opening; inserting the electrical connector to the connector inlet from the back; and attaching the lid part to the case part to form the electrical connector casing. The inlet opening and the lid opening as viewed from a front-back direction are placed with different rotational angle from one another.

According to the present invention, the electrical connector casing includes the case part having the connector inlet and the lid part having the lid opening. The openings of the connector inlet and the lid opening have substantially the same shape but are angled differently from each other. An electrical connector is inserted from the back of the lid part through the lid opening, and is rotated to be inserted into the connector inlet from the back of the case part. When the lid part attaches to the case part, due to the rotationally different angles between the lid opening and the connector inlet, the electric connector is fixedly mounted in the casing, and thus will not come out from the casing. Because of this unique and simple structure, the electrical connector casing of the present invention can be assembled easily and quickly by anyone without using any tools. Further, since the structure is simple, the electrical connector casing can be manufactured at low cost. Further, the electrical connector casing of the present invention is able to mount the electrical connector inside of the casing without causing any stress such as bent or twist on the connector or cable.

BRIEF DESCRIPTION OF THE DRAWINGS

FIG. 6A is a plan view showing an example of structure of the case part of the present invention as viewed from the front, and FIG. 6B is a plan view showing an example of structure of the case part of the present invention as viewed from the back.

FIG. 10A is a plan view showing an example of structure of the lid part of the present invention as viewed from the side, and FIG. 10B is a plan view showing an example of structure of the lid part of the present invention as viewed from the top.

FIG. 12B is a schematic diagram showing a structure of a USB female connector (USB receptacle) as seen from the port to which a USB male connector can be plugged in.

DETAILED DESCRIPTION OF THE PREFERRED EMBODIMENTS

The electrical connector casing of the present invention will be described in detail with reference to the accompanying drawings. The electrical connector casing includes a case part having a connector inlet and a lid part having a lid opening. The openings of the connector inlet and the lid opening have substantially the same shape but are angled differently from each other. An electrical connector is inserted from the back of the lid part through the lid opening, and is rotated to be inserted into the connector inlet from the back of the case part. When the lid part attaches to the case part, due to the rotationally different angles between the lid opening and the connector inlet, the electric connector is fixedly mounted in the casing, and thus will not come out from the casing. It should be noted that although the present invention is not limited to a particular type of connector, in this disclosure, a USB connector is mainly described for the purpose of illustration.

Figure 1:
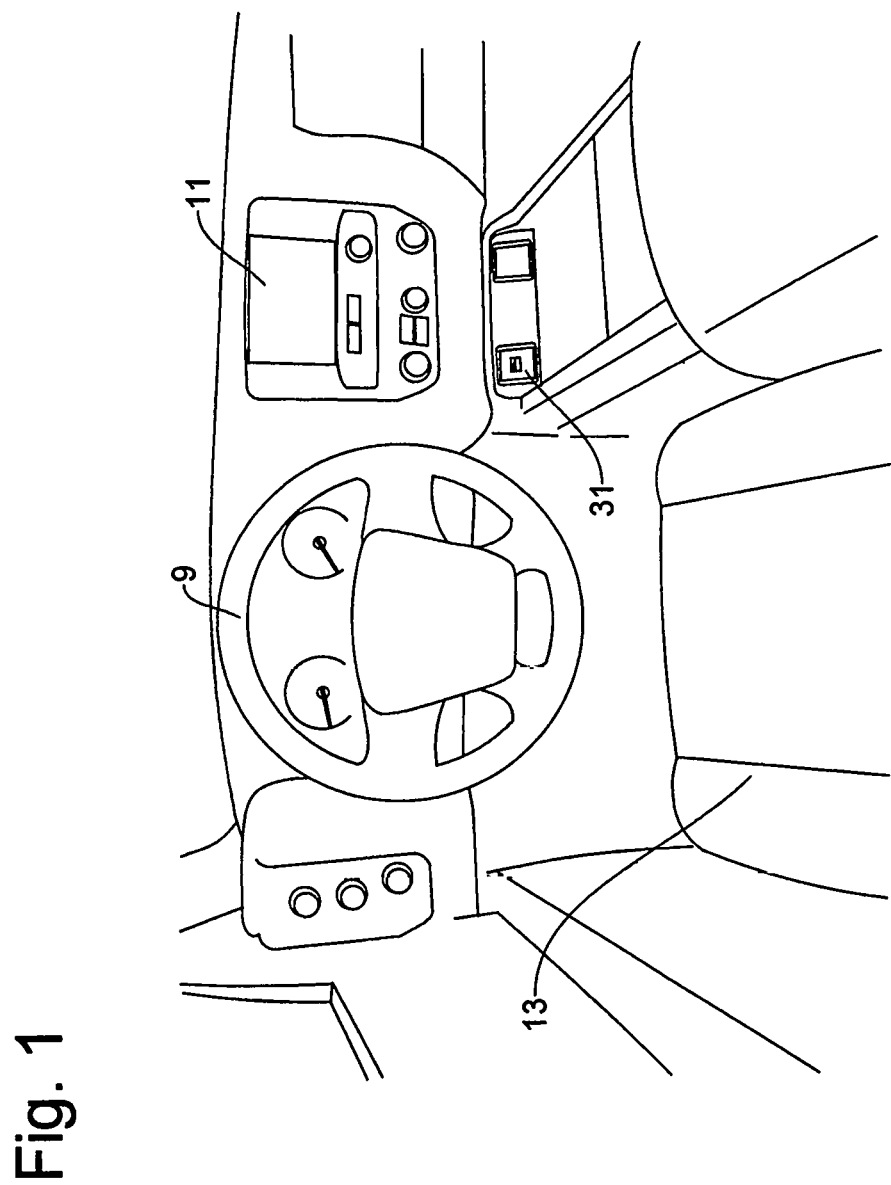
FIG. 1 is a schematic diagram showing an inside of a vehicle where the electrical connector casing of the present invention can be advantageously implemented.

FIG. 1 is a schematic diagram showing an inside of a vehicle where the electrical connector casing of the present invention can be advantageously implemented. The example of FIG. 1 shows a steering wheel 9, a display 11 of a vehicle head unit, a driver seat 13, and an electrical connector casing 31. The electric connector casing 31 is preferably provided to connect a mobile device such as a tablet computer or other device to allow the user to sync such a mobile device with the head unit or enjoy extended functions unavailable on the head unit alone. Alternatively, the electric connector casing 31 may be simply used to charge the battery of such a mobile device.

The electrical connector casing 31 is inserted into a pre-configured opening on a dashboard of the vehicle that is designed to receive a component of predefined size and shape. The electrical connector casing 31 encloses an electrical connector, for example, a USB connector at one end of a cable which is typically connected to an infotainment system or a CAN (Control Area Network) bus of the vehicle at another end. On the front surface of the electrical connector casing 31, a USB port at the tip of the USB connector is exposed to which other USB connectors can be plugged in.

Figure 2:
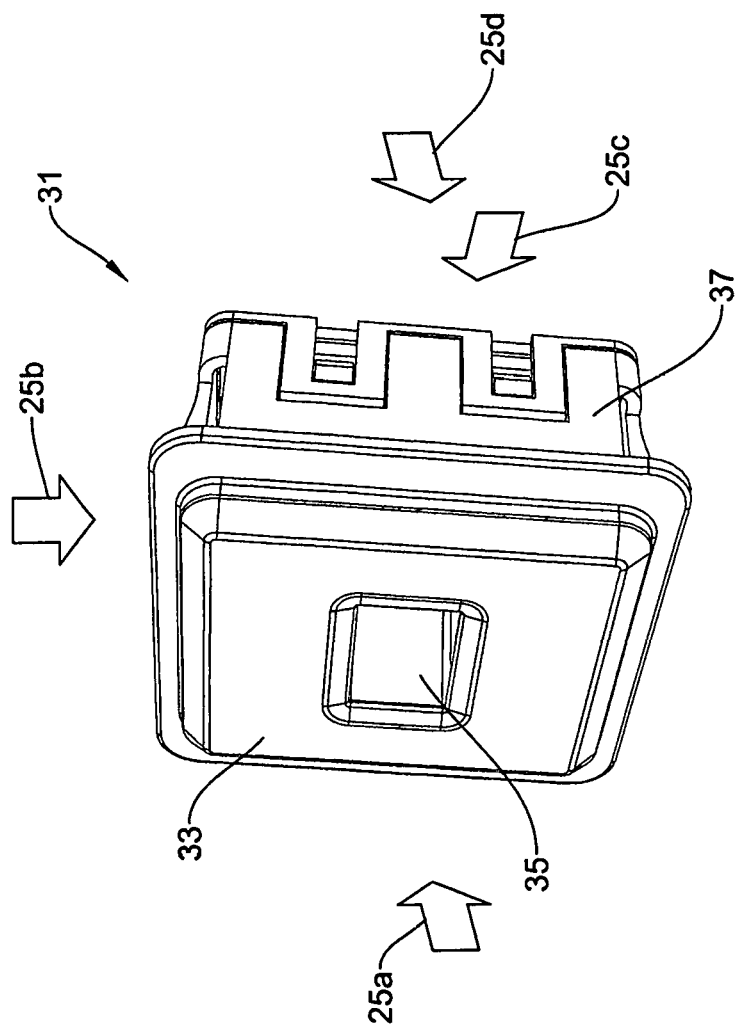
FIG. 2 is a perspective view showing an example of external shape of the electrical connector casing of the present invention as viewed diagonally from the front.

FIG. 2 is a perspective view showing an example of structure of the electrical connector casing 31 of the present invention as viewed diagonally from the front. Directional arrows 25a, 25b, 25c and 25b in FIG. 2 indicate the directions in relation to the electrical connector casing 31 used throughout the disclosure of the present invention. The arrow 25a denotes a front direction, the arrow 25b denotes a top direction, the arrow 25c denotes a side direction, and the arrow 25b denotes a back direction.

The electrical connector casing 31 has a generally square box shape and is configured by a front wall 33, a connector inlet 35, and a side wall 37. When assembled, an electrical connector such as a USB connector will be inserted in the connector inlet 35. As shown in FIG. 1, when installed on the vehicle, the front of the electric connector casing 31 faces the user and provides a USB port, which is reachable by the user such as a driver and a passenger.

Figure 3:
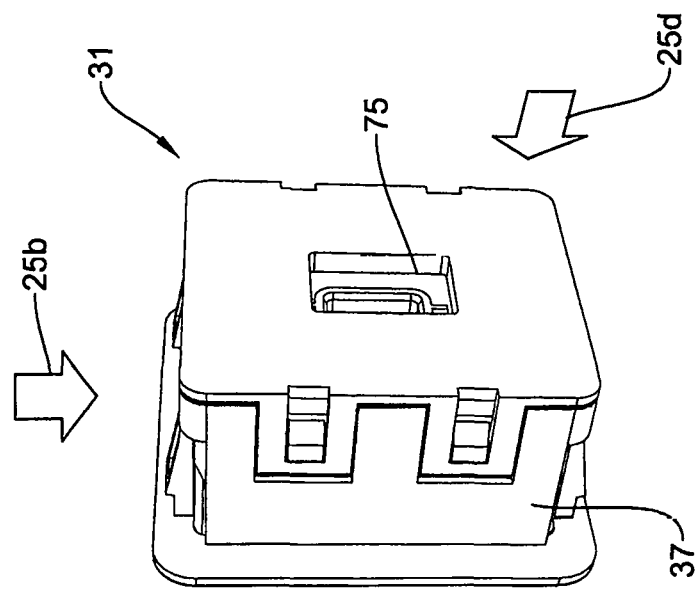
FIG. 3 is a perspective view showing an example of external shape of the electrical connector casing of the present invention as viewed diagonally from the back.

FIG. 3 is a perspective view showing an example of structure of the electrical connector casing 31 of the present invention as viewed diagonally from the back. At the back, the electrical connector casing 31 has a lid opening 75 on a lid 70 (FIG. 4) while the front portion of the casing 31 is hidden in the view of FIG. 3. Arrows 25b, 25c and 25d correspond to those in FIG. 2 indicating the viewing directions.

FIGS. 2 and 3 illustrate only the electrical connector casing 31, and do not show a USB connector which is to be enclosed by the electrical connector casing 31. A USB cable having a USB connector to be enclosed by the electrical connector casing 31 is shown in FIG. 12. As will be described in detail later, a USB cable 181 in FIG. 12 has a USB female connector 103 (USB receptacle) and a USB male connector 105. The electrical connector casing 31 in the preferred embodiment is designed to enclose the USB female connector 103. In the example shown FIG. 1, the USB male connector 105 may be connected to the vehicle's head unit to establish electrical connection between an external device such as a mobile device and the head unit via the female connector 103.

Figure 4:
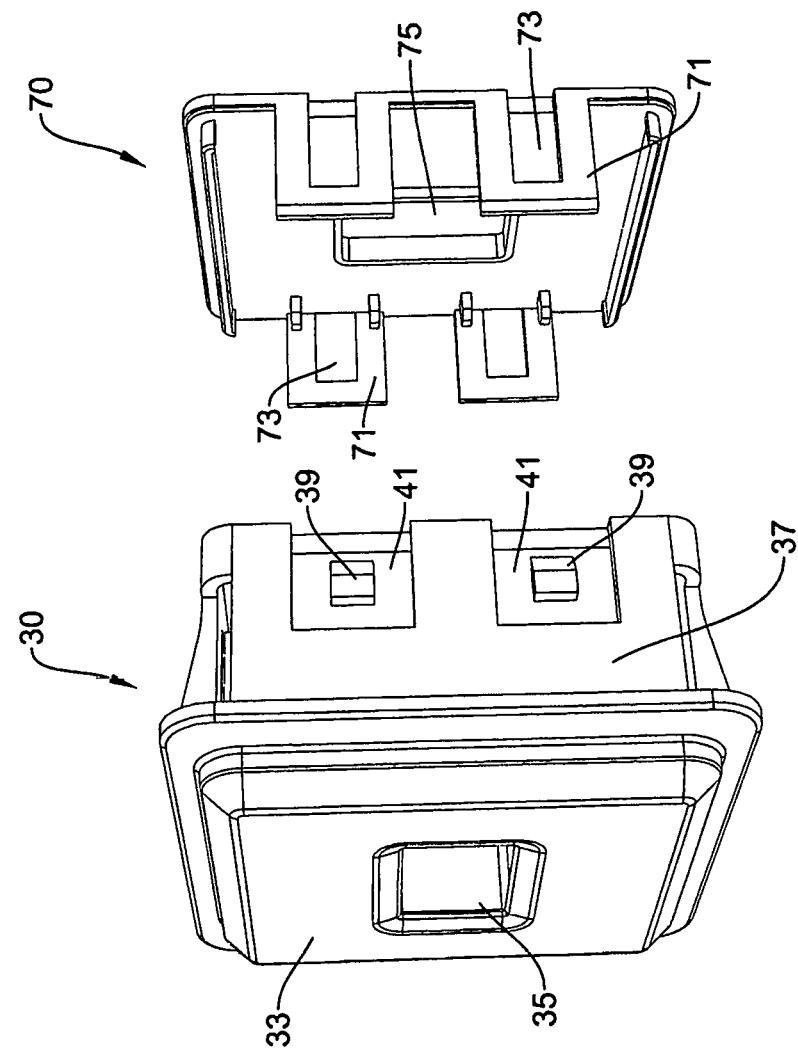
FIG. 4 is a perspective view showing the electrical connector casing of the present invention as viewed diagonally from the front similar to that of FIG. 2, while the casing is disassembled into a case part and a lid part.

FIG. 4 is a perspective view showing a structure of the electrical connector casing 31 of the present invention as viewed diagonally from the front similar to FIG. 2, but the electrical connector casing 31 is disassembled into two. As shown, the electrical connector casing 31 is comprised mainly of a case part 30 and a lid part 70. Both the case part 30 and the lid part 70 are preferably made of plastic material.

The case part 30 has interlocking protrusions 39 at its sides, for example, two protrusions 39 on each side. The lid part 70 has apertures 73 at its sides formed by lid sidewalls 71, for example, two apertures on each side. Each of the interlocking protrusions 39 of the case part 30 is positioned and adapted to engage with each of the corresponding apertures 73 of the lid part 70. When the lid part 70 attaches to the case part 30, the interlocking protrusions 39 snap fit into the corresponding apertures 73, thereby securely fastening the lid part 70 and the case part 30. Around each interlocking protrusion 39 of the case part 30 is a groove 41, which is sized to receive the corresponding lid sidewall 71 that has the aperture 73 of the lid part 70.

Other attachment mechanisms instead of the combination of the interlocking protrusions 39 and the apertures 73 may also be used to attach the lid part 70 to the case part 30. As will be described in more detail later, the openings of the connector inlet 35 and the lid opening 75 have an elongated rectangular shape having substantially same shape and size. However, the openings of the connector inlet 35 and the lid opening 75 are angled differently as viewed from the front or the back to fasten the USB connector in the casing as will be described later.

Figure 5:
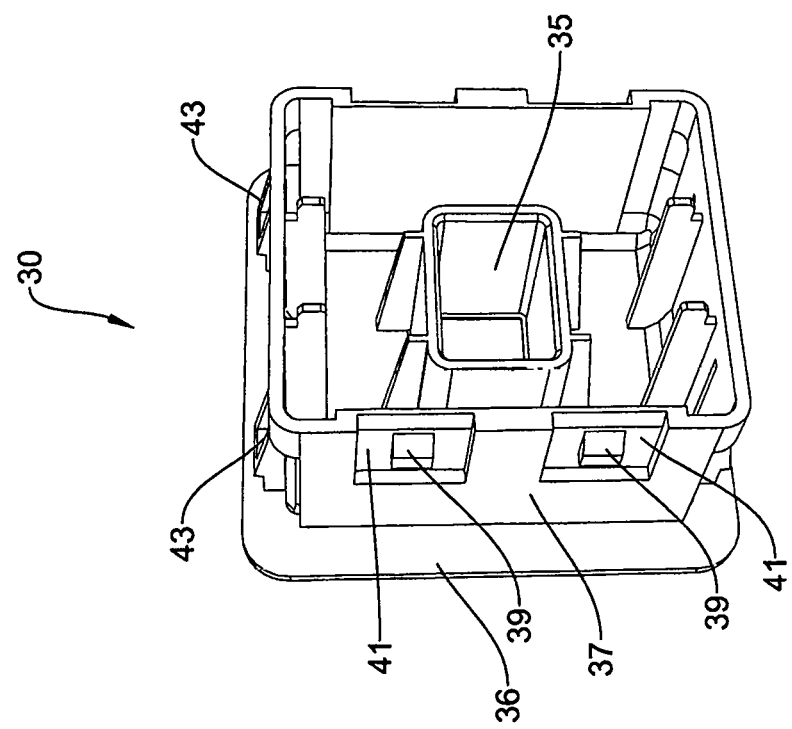
FIG. 5 is a perspective view showing an example of structure of the case part of the present invention as viewed diagonally from the back.

FIG. 5 is a perspective view showing a structure of the case part 30 of the electrical connector casing 31 as viewed diagonally from the back. As noted above, the groove 41 is provided around the protrusion 39 in which the depth of the groove 41 is adopted to match the thickness of the sidewall 71 of the lid part 70. Thus, when the case part 30 and the lid part 70 are attached, the groove 41 minimizes the difference in a surface level between the sidewall 37 of the case part 30 and the sidewall 71 of the lid part 70.

The connector inlet 35 is an opening that penetrates from the front to the inside of the case part 30 at about the center thereof. The connector inlet 35 is formed in a rectangular tube shape where, in the preferred embodiment, the longitudinal direction of the connector inlet 35 is oriented in a horizontal direction. Further with respect to the connector inlet 35, the inside of the rectangular tube shape is sized and adapted to receive an electrical connector, such as a female USB standard A plug, in a snug fit manner.

An outer flange 36 of the case part 30 works as a stopper when the electrical connector casing 31 is inserted into a target opening, such as a pre-configured opening on the dashboard at the inside of a vehicle. Protrusions 43 are provided at the top and bottom of the case part 30 and are adopted to fit into the shape of the pre-configured opening in the vehicle that receives the electrical connector casing 31. Although two protrusions 43 are provided at each of the top and the bottom of the case part 30, the number, size, etc. of the protrusion 43 can be changed depending on actual applications.

FIG. 6A is a plan (front) view showing the case part 30 of the electrical connector casing 31 of the present invention as viewed from the front (arrow 25a in FIG. 2). FIG. 6B is a plan (rear) view showing the case part 30 of the electrical connector casing 31 of the present invention as viewed from the back (arrow 25d in FIG. 2). As shown, the connector inlet 35 as viewed from the front and the rear is shaped to be an elongated rectangular opening that is longer in a lateral (horizontal) direction.

Four (4) protrusions 43 are provided at the top and bottom outside walls of the case part 30 where each protrusion 43 is inclined upwardly toward the outer flange 36. The protrusions 43 are adopted to engage with the shape of an opening, such as the pre-configured opening described with reference to FIG. 1, to which the electrical connector casing 31 is inserted. For example, there is a gap between the end of the protrusion 43 and the outer flange 36 so that an edge of the pre-configured opening fits in the gap. The position, shape or size of the protrusions 43 may be modified or the protrusions 43 may be completely omitted depending of the opening to which the electrical connector casing 31 is to be inserted. As noted above with reference to FIG. 4, four (4)

interlocking protrusions 39 are provided at the left and right sidewalls of the case part 30 to engage with the corresponding apertures 73 of the lid part 70.

Figure 7A:
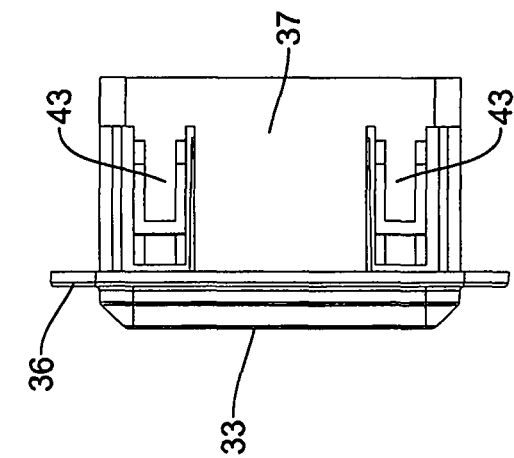
FIG. 7A is a plan view showing an example of structure of the case part of the present invention as viewed from the side.
Figure 7B:
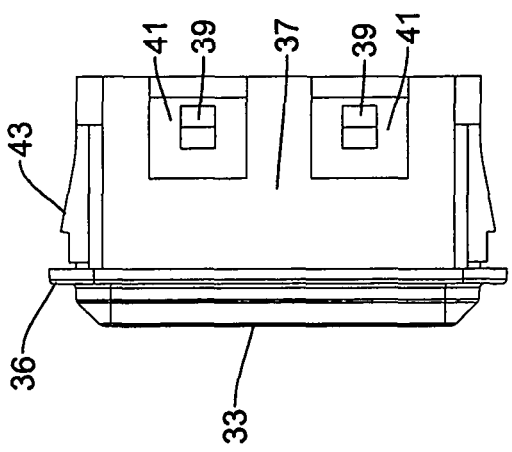
FIG. 7B is a plan view showing an example of structure of the case part of the present invention as viewed from the top.

FIG. 7A is a plan (side) view showing a structure of the case part 30 of the electrical connector casing 31 of the present invention as viewed from the side (arrow 25c in FIG. 2). FIG. 7B is a plan (top) view showing a structure of the case part 30 of the electrical connector casing 31 of the present invention as viewed from the top (arrow 25b in FIG. 2). The case part 30 is symmetrical in its left side and right side, and is also symmetrical in its top and bottom. In the preferred embodiment designed to casing the USB connector, the depth of the case part 30 from the front to the back is in the range of 28 mm to 32 mm.

Figure 8:
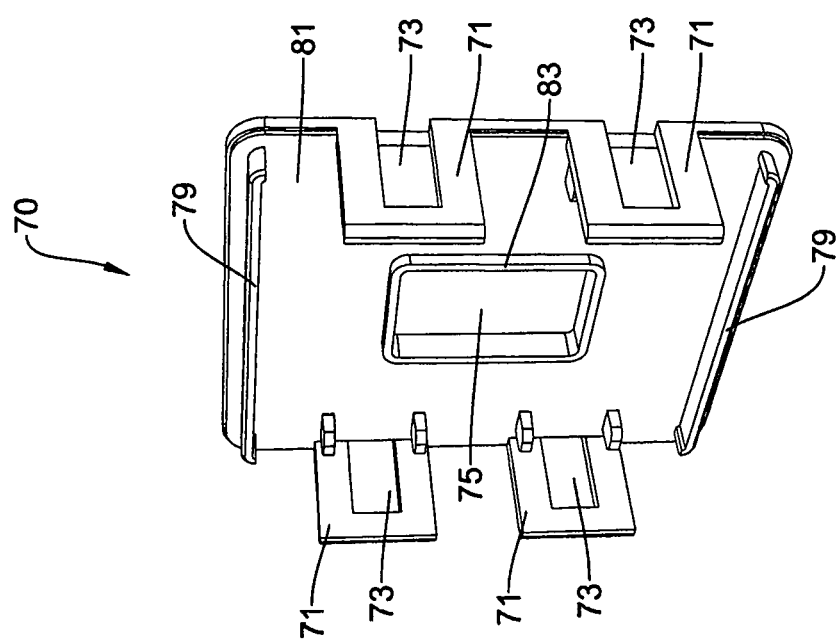
FIG. 8 is a perspective view showing an example of structure of the lid part of the present invention as viewed diagonally from the front.

FIGS. 8, 9A, 9B, 10A and 10B show the lid part 70 of the electrical connector casing 31 of the present invention each being in different viewing angle. FIG. 8 is a perspective view of the lid part 70 of the electrical connector casing 31 of the present invention as viewed diagonally from the front (arrow 25a in FIG. 2). The lid part 70 has lid sidewalls 71 at its left side and right side each being shaped like a side projection. As noted above, each of the lid sidewalls 71 has an aperture 73 which is designed to engage with the corresponding interlocking protrusions 39 of the case part 30 (FIGS. 4-7A) so that the case part 30 and the lid part 70 snap fit with one another.

At about the center, the lid part 70 has a lid opening 75 which has an elongated rectangular shape and is adopted for the electrical connector to pass through. As shown, unlike the connector inlet 35 of the case part 30 (FIG. 6A), the longitudinal direction of the lid opening 75 is oriented in a vertical direction. Immediately around the lid opening 75 on the front of the lid part 70, a back stopper 83 is provided, which is a small protrusion that projects from the back wall 81. In the preferred embodiment applied to the USB connector, the protrusion of the back stopper 83 is in the range of 0.5 mm to 5 mm. As will be described later in detail, the back stopper 83 is provided to support the outer body of the USB female connector 103 from the back when assembled.

The lid part 70 has a back wall 81 which basically functions as a lid or cover of the electrical connector casing 31 of the present invention. The lid opening 75 and the back stopper 83 noted above are formed at about the center of the back wall 81. Flanges 79 project from the upper and lower portions of the back wall 81, which are designed to fit snugly inside the case part 30 when the lid part 70 is attached to the case part 30 to form the electrical connector casing 31.

Figure 9B:
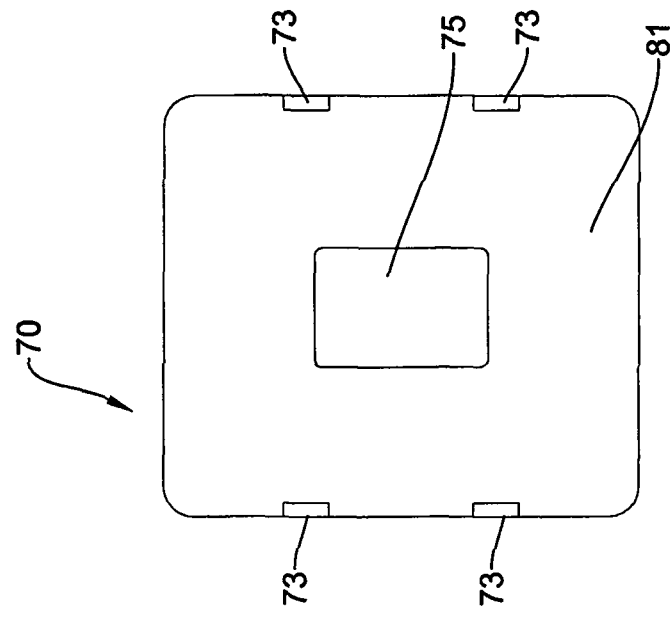
FIG. 9B is a plan view showing an example of structure of the lid part of the present invention as viewed from the back.
Figure 9A:
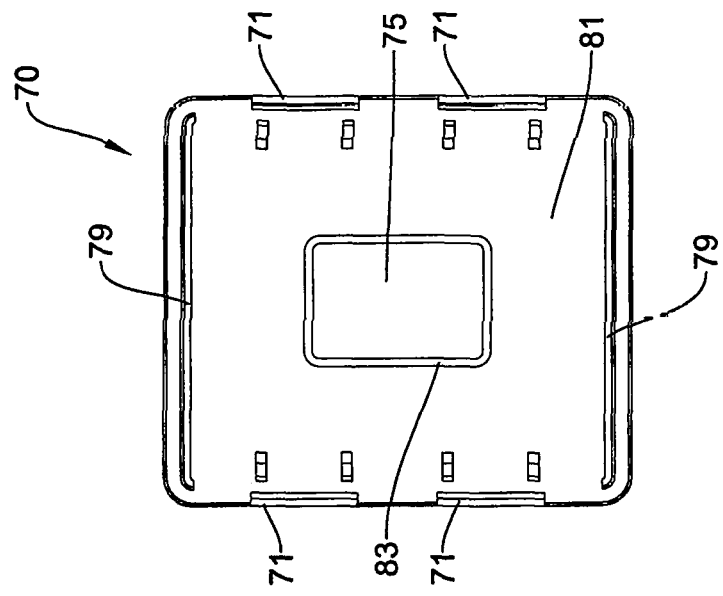
FIG. 9A is a plan view showing an example of structure of the lid part of the present invention as viewed from the front.

FIG. 9A is a plan (front) view showing the lid part 70 of the electrical connector casing 31 of the present invention as viewed from the front. This view shows an inside structure of the electrical connector casing 31 made by the lid part 70 when assembled with the case part 30. FIG. 9B is a plan (rear) view showing the lid part 70 of the electrical connector casing 31. This view shows an outside structure, i.e., back exterior of the electrical connector casing 31 made by the lid part 70.

As shown in FIGS. 9A and 9B, and noted above with reference to FIG. 8, the lid opening 75 is an elongated rectangular opening that is longer in the vertical direction as viewed from the front and the back. In comparison to the connector inlet 35 shown in FIGS. 6A and 6B, the angle of the elongated portion of the lid opening 75 differs from that of the elongated portion of the connector inlet 35 by about a right angle (90 degrees). Namely, the connector inlet 35 and the lid opening 75 are formed with substantially different rotational angles as viewed from the front or the back. In the preferred embodiment applied to the USB connector, the longer side of the lid opening 75 has the length in the range of 16 mm to 18 mm, and the shorter side has the length in the range of 10 mm to 13 mm.

FIG. 10A is a plan (side) view showing the lid part 70 of the electrical connector casing 31 of the present invention as viewed from the side (arrow 25c in FIG. 2). FIG. 10B is a plan (top) view showing the lid part 70 of the electrical connector casing 31 of the present invention as viewed from the top (arrow 25b in FIG. 2). FIGS. 10A and 10B show the lid sidewalls 71 each having the aperture 73, and flanges 79 as described above with reference to FIG. 8. Similar to the case part 30, the lid part 70 is left-right symmetrical as well as top-bottom symmetrical.

Figure 11:
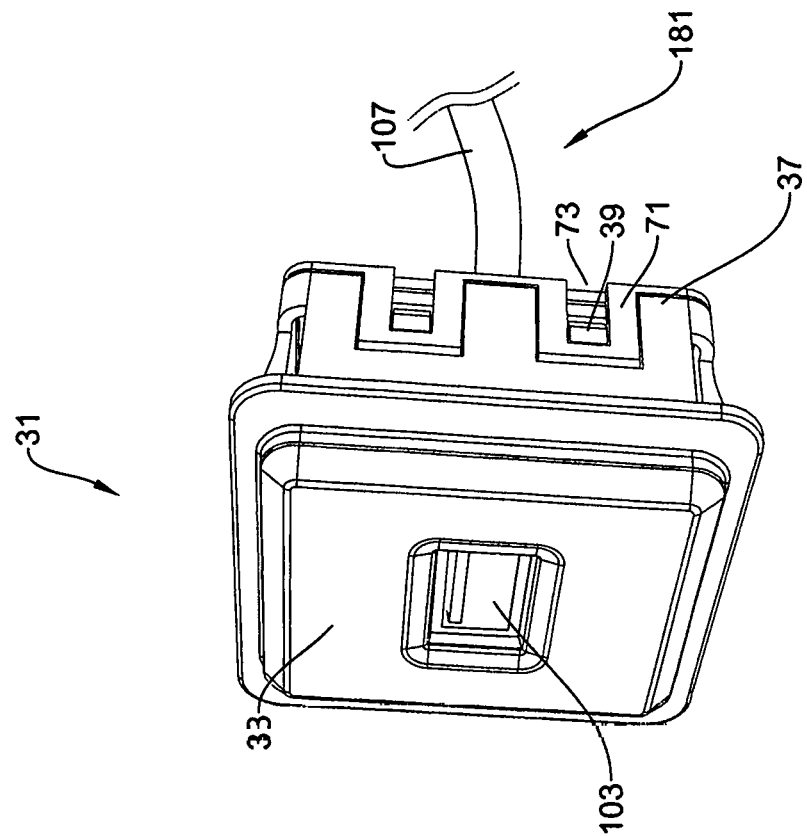
FIG. 11 is a perspective view showing an example of structure of the electric connector casing of the present invention enclosing a USB female connector as viewed diagonally from the front.

FIG. 11 is a perspective view showing the electrical connector casing 31 of the present invention as viewed diagonally from the front. This example shows the case in which the USB female connector 103 (shown in FIGS. 12A, 12B and 12C) at an end of the cable 107 is attached inside of the electrical connector casing 31. The USB port of the USB female connector 103 is reachable through the opening of the connector inlet 35 at the front of the electrical connector casing 31. The case part 30 and the lid part 70 snap fit with one another via the mechanism of the apertures 73 on the lid sidewalls 71 and the interlocking protrusions 39. In FIG. 11, a portion of the cable 107 and the male connector 105 at another end are omitted.

Figure 12A:
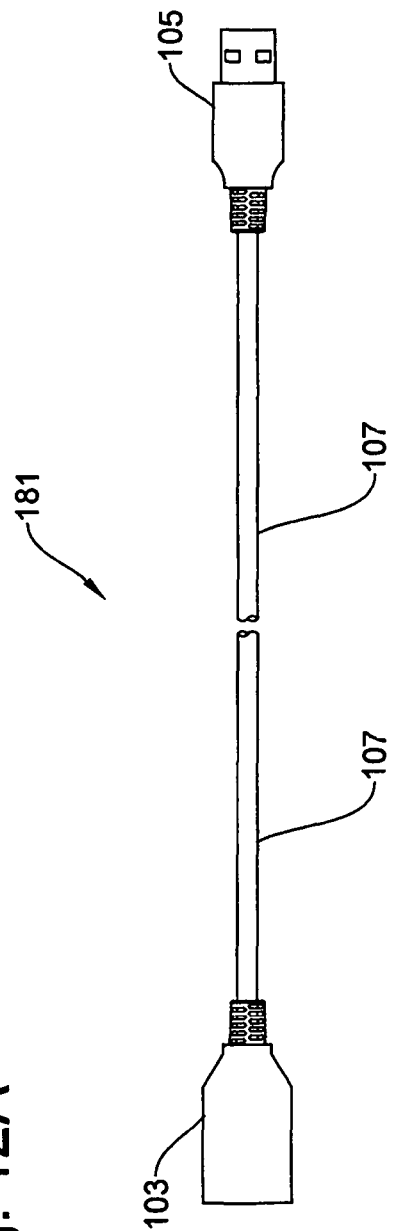
FIG. 12A is a schematic diagram showing an external shape of a USB cable which is used for the electrical connector casing of the present invention.
Figure 12B:
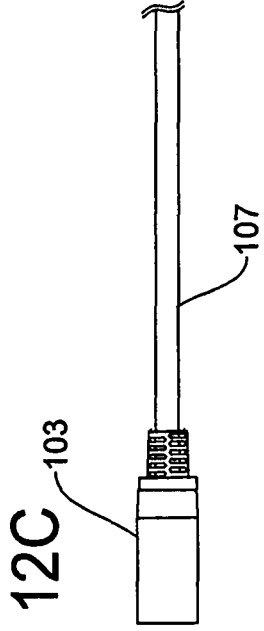
Figure 12C:
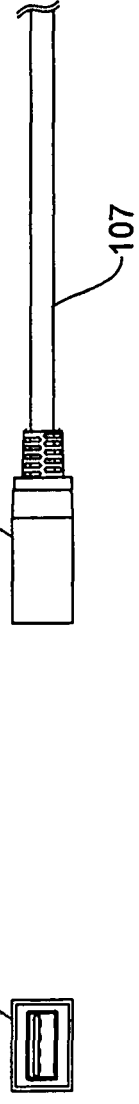
FIG. 12C is a schematic diagram showing the structure of the USB female connector as seen from the side.

FIGS. 12A-12C are schematic diagrams showing external structures of a USB cable 181 which can be advantageously applied to the electrical connector casing 31 of the present invention. In FIGS. 12A-12c, the USB cable 181 is placed flat on a horizontal surface. The top view of FIG. 12A shows the USB cable 181 having a USB female connector 103 at one end, and a USB male connector 105 at another end. The USB cable 181 illustrated in FIG. 12A is a type-A USB cable which can transmit both power and data. Typically, the USB female connector 103 is enclosed in the electrical connector casing 31 of the present invention as shown in FIG. 11 so as to allow the user to connect an external device such as a tablet computer while the USB male connector 105 will be connected to the vehicle head unit via CAN bus.

FIG. 12B shows the USB female connector 103 of the USB cable 181 as seen from the port (front end) into which a USB male connector for an external device will be inserted. As shown, the frontal shape of the USB female connector 103 (electrical connector) is an elongated rectangle, which matches the shape of the lid opening 75 and the connector inlet 35. However, as noted above, the angles of the lid opening 75 and the connector inlet 35 are different abut 90 degrees with one another. FIG. 12C is an illustration of the USB female connector 103 of the USB cable 181 as seen from the side. The width of the USB female connector 103 matches with the shorter width of the lid opening 75 and the connector inlet 35.

Hereafter, the process of installing the USB female connector 103 in the electrical connector casing 31 of the present invention will be described with reference to FIGS. 13A-13B, 14, and 15A-15B. FIG. 13A is a plan (front) view of the lid part 70 viewed from the front showing the inside thereof where the USB female connector 103 is inserted from the back through the lid opening 75. The exterior of the USB female connector 103 has a rectangular shape as viewed from the port (front end), and is slightly smaller than the lid opening 75. In other words, the lid opening 75 is designed slightly larger than the USB female connector 103 viewed from the front so that the USB female connector 103 can pass through.

For example, the rectangular interior of the lid opening is sized 1 to 10 percent larger than the rectangular exterior of the USB female connector 103. As noted above, the lid opening 75 is an elongated rectangular whose longer side is oriented in the vertical direction where its shape matches the shape of the USB female connector 103 viewed from the port. Accordingly, the USB female connector 103 can be inserted into the lid opening 75 when the USB female connector 103 viewed from the port is angled in the same direction as that of the lid opening 75 as shown in FIG. 13A.

Figure 13B:
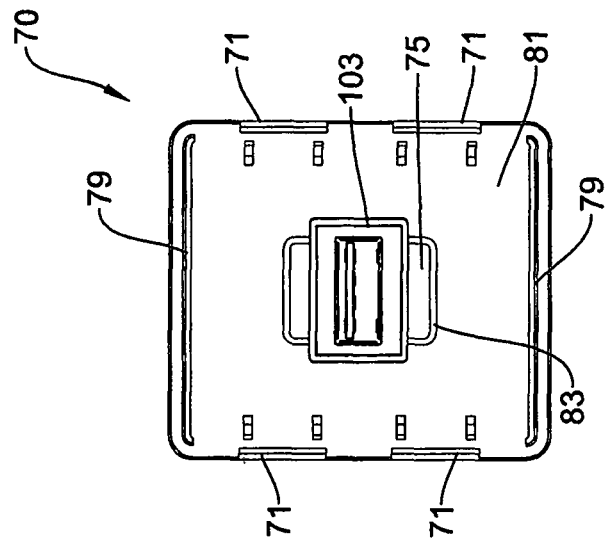
FIG. 13B is a plan view of the lid part viewed from the front where the USB female connector where the USB female connector is rotated 90 degrees clockwise or counterclockwise.
Figure 13A:
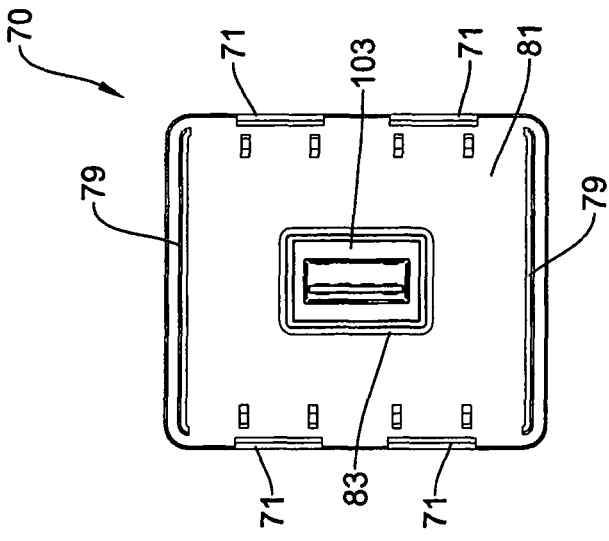
FIG. 13A is a plan view of the lid part viewed from the front where the USB female connector is inserted from the back through a lid opening.

As shown in FIG. 13B, once the USB female connector 103 is fully inserted through the lid opening 75, the USB female connector 103 is rotated about 90 degrees clockwise or counterclockwise so that the USB female connector 103 as viewed from the port is positioned to be longer in the lateral (horizontal) direction. Namely, the user assembling the electrical connector casing 31 to mount therein the USB female connector 103 only needs to turn the USB female connector 103 by 90 degrees. When the USB female connector 103 is positioned to be longer in the lateral direction, the USB female connector 103 does not fall out from the lid opening 75 that is positioned to be longer in the vertical direction.

The USB female connector 103 is then inserted into the connector inlet 35 from the back of the case part 30. As shown in FIG. 5, the connector inlet 35 is formed in a rectangular tube shape and the opening of the connector inlet 35 is longer in the lateral direction. The inside of the rectangular tube shape is sized 1 to 10 percent larger than the exterior of the USB female connector 103 to snugly receive therein the USB female connector 103. The four walls that form the rectangular tube shape of the connector inlet 35 make contact with four outer sides of the USB female connector 103 and hold the USB female connector 103. In other words, the connector inlet 35 works as a stabilizer of the USB female connector 103.

As the USB female connector 103 is fully inserted into the connector inlet 35 of the case part 30 so that the female USB port becomes accessible from the front of the case part 30, the lid part 70 is attached from the back of the case part 30. The lid sidewalls 71 of the lid part 70 slide into the corresponding grooves 41 on the case part 30 (see FIG. 4). The apertures 73 formed on the lid sidewalls 71 engage with the interlocking protrusions 39 to lock the lid part 70 to the case part 30 as shown in FIG. 11. The center of the connector inlet and the center of the lid opening 75 are aligned in a straight line from the front to the back so that the cable 107 can come straight out of the lid opening 75 without causing any stress such as bent or twist on the connector 103 or the cable 107. As a result, the electrical connector casing 31 of the present invention is assembled as shown in the perspective view of FIG. 11 and the front view of FIG. 14.

Figure 15A:
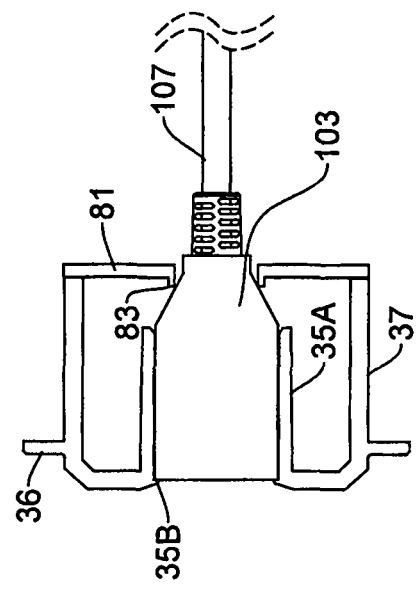
FIG. 15A is a partial cross sectional view of the electrical connector casing as viewed from the top when the case part and the lid part are separated.
Figure 15B:
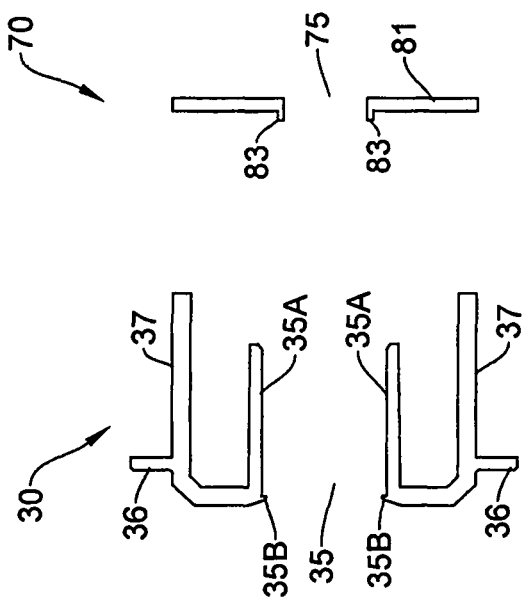
FIG. 15B is a partial cross sectional view of the electrical connector casing as viewed from the top when the USB female connector is enclosed inside the casing.

FIGS. 15A and 15B are partial cross sectional diagrams schematically showing an structure of the electrical connector casing 31 as cut by a lateral plane at the middle to describe the inner configuration of the electrical connector casing 31. It should be noted that, FIGS. 15A and 15B are partial cross sectional views showing only the portions of the case part 30 and the lid part 70 related to the stopper mechanism involved in the present invention. FIG. 15A is a cross sectional view of the electrical connector casing 31 as viewed from the top when the case part 30 and the lid part 70 are separated. FIG. 15B is a cross sectional view of the electrical connector casing 31 when the USB female connector 103 is enclosed inside the electrical connector casing 31 formed by the case part 30 and the lid part 70.

As shown in FIG. 15A, the connector inlet 35 of the case part 30 has opening side walls (inner walls) 35A. The opening side walls 35A form the rectangular tube shape of the connector inlet 35 as shown in FIG. 5 and has a length ranging, for example, from 5 mm to 30 mm. At the front end of the connector inlet 35 is provided with a stopper 35B that prevents the USB female connector 103 inserted to the connector inlet 35 from moving further toward outside (left). As shown, the stopper 35B protrudes to the inside of the connector inlet 35 so as to decrease the inner size of the connector inlet 35 at its end. In the preferred embodiment, the protrusion of the stopper 35B is about 1 mm in length, but it may take the range between 0.2 mm to 5 mm.

The lid part 70 has the lid opening 75 and the back wall 81. On an inner end of the back wall 81, the back stopper 83 which is directed to the front is provided around the lid opening 75. The back stopper 83 makes contact with an outer body of the USB female connector 103 to securely hold the USB female connector 103 inside the electrical connector casing 31. Since various parameters of the USB cables including the outer size and shape are predefined by the international standard, the back stopper 83 can be appropriately designed in size and shape to securely hold female connector 103 within the electrical connector casing 31 without play.

FIG. 15B is a cross sectional view of the electrical connector casing 31 when the USB female connector 103 is installed therein. When the lid part 70 is attached to the case part 30, the USB female connector 103 is pressed toward the left by the lid part 70 and is stopped by the stopper 35B of the case part 30. The USB female connector 103 is further stopped by the back stopper 83 of the lid part 70 as noted above. Accordingly, the USB female connector 103 is held securely inside the electrical connector casing 31 by being securely pressed from the front and the back.

Figure 14:
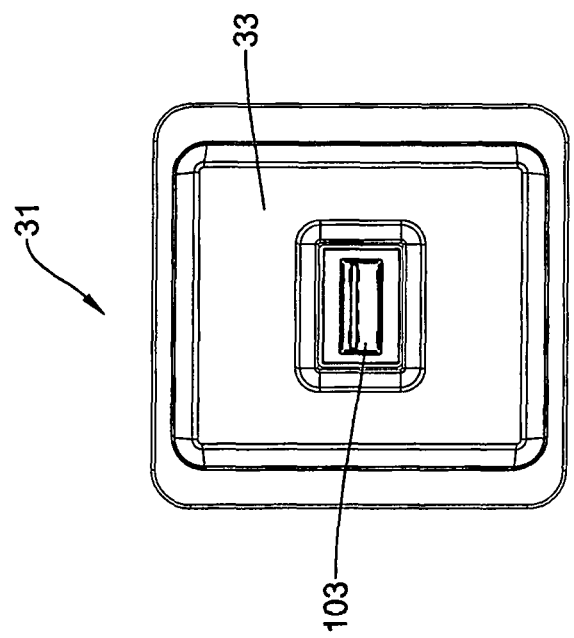
FIG. 14 is a plan view of the electrical connector casing of the present invention as viewed from the front where the USB female connector enclosed inside the casing as the lid part and the case part are attached.

The USB female connector 103 as enclosed in the electrical connector casing 31 sits in a position where the USB female connector 103, as viewed from the port, to be longer in the lateral direction as shown in FIG. 14. As noted above, the lid opening 75 of the lid part 70 is shaped to be longer in the vertical direction, i.e., 90 degrees different from the connector inlet 35 of the case part 30. Once the lid part 70 is fastened to the case part 30, the USB female connector 103 will not come back from the lid opening 75 since the USB female connector 103 has been rotated 90 degrees as shown in FIG. 13B and this rotation angle is maintained by the connector inlet 35 of the case part 30.

The cable 107 to the USB female connector 103 comes out from the inside of the electrical connector casing 31 to the outside through the lid opening 75 without being bent or twisted. This is because the center of the lid opening 75 and the center of the connector inlet 35 are aligned in a straight line from the front to the back. Since the cable 107 does not bend or twist inside the electrical connector casing 31, deterioration of the cable 107 can be minimized.

Figure 16A:
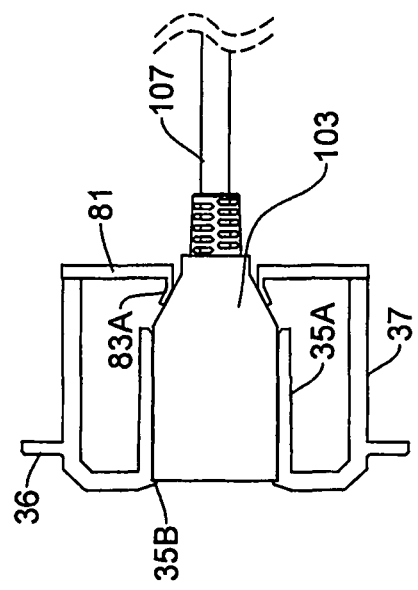
FIG. 16A is a partial cross sectional view of the electrical connector casing as viewed from the top when the case part and the lid part are separated similar to FIG. 15A except that the back stopper of the lid part is inclined to fit the back slope of the USB female connector.
Figure 16B:
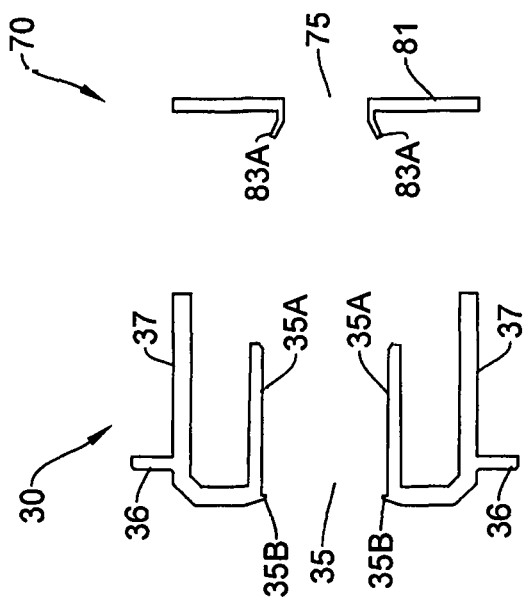
FIG. 16B is a partial cross sectional view of the electrical connector casing as viewed from the top 16A when the USB female connector is enclosed inside the casing.

FIGS. 16A and 16B are cross sectional top views of an alternative embodiment of the present invention similar to that of FIGS. 15A and 15B, except that the back stopper 83A of the lid part 70 is shaped to fit the back slope of the USB female connector 103. Namely, the back stopper 83A is inclined to receive the slope of the outer body of the USB female connector 103 in a manner to increase the area of contact between the back stopper 83A and the USB female connector 103. Depending on the size and shape of the USB female connector 103, the size and shape of the back stopper 83 may be modified.

While the embodiment of the electrical connector casing 31 of the present invention has been described that encloses a type-A USB receptacle (USB female connector 103) illustrated in FIGS. 12A-12C, other types of electrical connectors, such as type-B USB, Micro-A USB, Micro-B USB, FireWire and HDMI, etc. can be used in the electrical connector casing 31 according to the present invention described above with minor modifications to the electrical connector casing 31 such as sizes of the connector inlet 35 and lid opening 75, etc.

In the above embodiment, the angle of the elongated portion of the lid opening 75 differs from that of the elongated portion of the connector inlet 35 by about 90 degrees. However, such a difference of angles may be modified, for example, 45 degrees or greater, as long as the connector to be encased inside the electrical connector casing 31 will be securely held and will not come out of the lid opening 75.

Moreover, in the embodiment described above, the connector inlet 35 as viewed from the front and the back is shaped to be an elongated rectangular opening that is longer in the horizontal direction, and the lid opening 75 is an elongated rectangular opening that is longer in the vertical direction. However, the connector inlet 35 can be an elongated rectangular opening that is longer in the vertical direction while the lid opening 75 is an elongated rectangular opening that is longer in the horizontal direction. While the shape of the connector inlet 35 and the lid opening 75 in the above embodiment is an elongated rectangular shape, other shapes, such as a triangle or an ellipse, are also possible. Similarly, the electrical connector as viewed from the front port may take such shapes as a triangle or an ellipse.

As has been described above, according to the present invention, the electrical connector casing includes the case part having the connector inlet and the lid part having the lid opening. The openings of the connector inlet and the lid opening have substantially the same shape but are angled differently from each other. An electrical connector is inserted from the back of the lid part through the lid opening, and is rotated to be inserted into the connector inlet from the back of the case part. When the lid part attaches to the case part, due to the rotationally different angles between the lid opening and the connector inlet, the electric connector is fixedly mounted in the casing, and thus will not come out from the casing. Because of this unique and simple structure, the electrical connector casing of the present invention can be assembled easily and quickly by anyone without using any tools. Further, since the structure is simple, the electrical connector casing can be manufactured at low cost. Further, the electrical connector casing of the present invention is able to mount the electrical connector inside of the casing without causing any stress such as bent or twist on the connector or cable.

Although the electrical connector casing of the present invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. An electrical connector casing for mounting an electrical connector inside thereof, comprising:

a case part having a connector inlet that penetrates from a front to a back, the connector inlet being adopted to receive and hold an electrical connector and expose an end port of the electrical connector to the front of the connector inlet, and a lid part having a lid opening with a shape that matches with a frontal shape of the electrical connector to allow the electrical connector to pass therethrough, wherein the lid part is adopted to directly attach to the case part by snap fitting, and wherein the connector inlet and the lid opening as viewed from a front-back direction are placed with different rotational angle from one another.

2. The electrical connector casing as defined in claim 1, wherein the lid part further comprises a back stopper that inwardly projects from a back wall of the lid part around the lid opening, and a part of the back stopper contacts with an outer body of the electrical connector to stably support the electrical connector.

3. The electrical connector casing as defined in claim 1, wherein the lid part has a plurality of sidewalls each having an aperture to fit with an interlocking protrusion formed on the case part thereby snap fitting the lid part and the case part when attached together.

4. The electrical connector casing as defined in claim 1, wherein the shape of the lid opening is an elongated rectangle.

5. The electrical connector casing as defined in claim 4, wherein the lid opening having the elongated rectangle shape is placed to be longer in a horizontal direction.

6. The electrical connector casing as defined in claim 4, wherein the lid opening having the elongated rectangle shape is placed to be longer in a vertical direction.

7. The electrical connector casing as defined in claim 1, wherein the difference of the rotational angle between the connector inlet and the lid opening is about 90 degrees.

8. The electrical connector casing as defined in claim 1, wherein the difference of the rotational angle between connector inlet and the lid opening is greater than 45 degrees.

9. The electrical connector casing as defined in claim 2, wherein the back stopper is inclined to fit with a back slope of the outer body of the electrical connector.

10. The electrical connector casing as defined in claim 1, wherein the connector inlet is formed in a rectangular tube shape.

11. The electrical connector casing as defined in claim 10, wherein the connector inlet is placed to be longer in the horizontal direction.

12. The electrical connector casing as defined in claim 10, wherein the connector inlet is placed to be longer in the vertical direction when the lid opening is place to be longer in the horizontal direction.

13. The electrical connector casing as defined in claim 1, further comprising a stopper at the front end of the connector inlet that stops the electrical connector inserted to the connector inlet.

14. The electrical connector casing as defined in claim 1, wherein a center of the connector inlet and a center of the lid opening are aligned in a straight line from the front to the back so that a cable having the electrical connector at one end can come straight out of the lid opening without being bent or twist.

* * * * *